Figure 1:
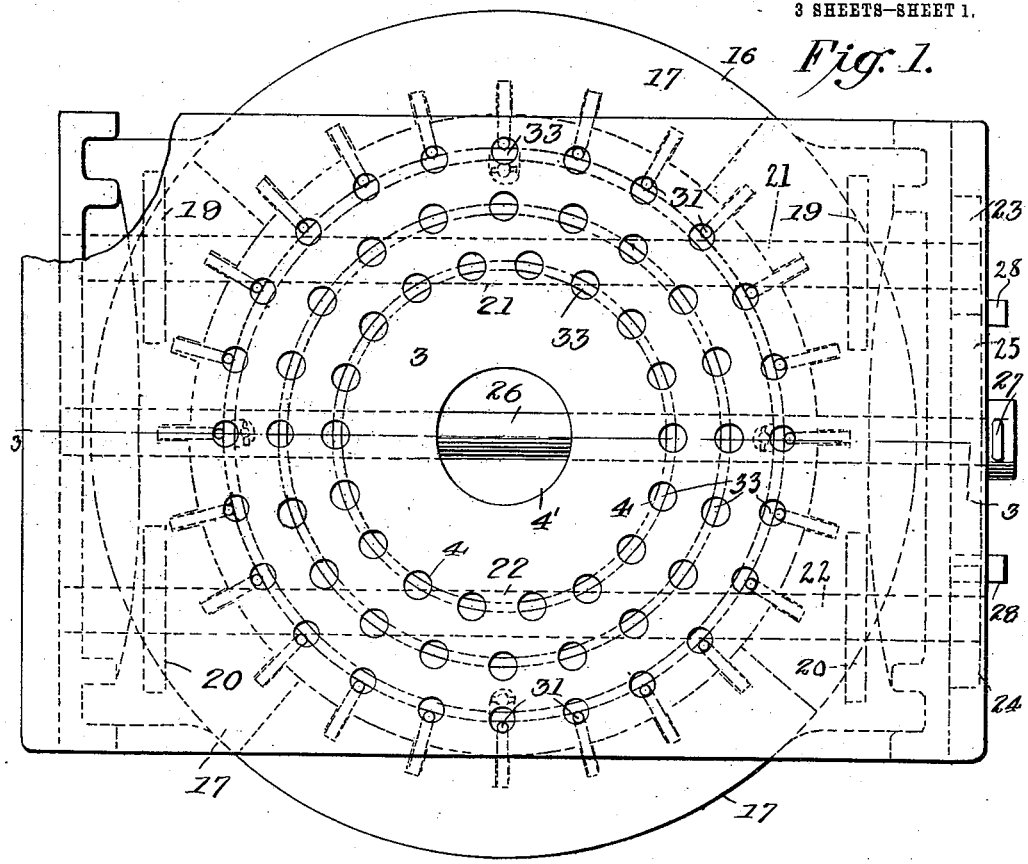

J. R. PLACE.
MACHINE FOR HEADING BARRELS, KEGS, AND THE LIKE.
APPLICATION FILED MAY 27, 1911.

1,070,841.

Patented Aug. 19, 1913.

3 SHEETS—SHEET 1.

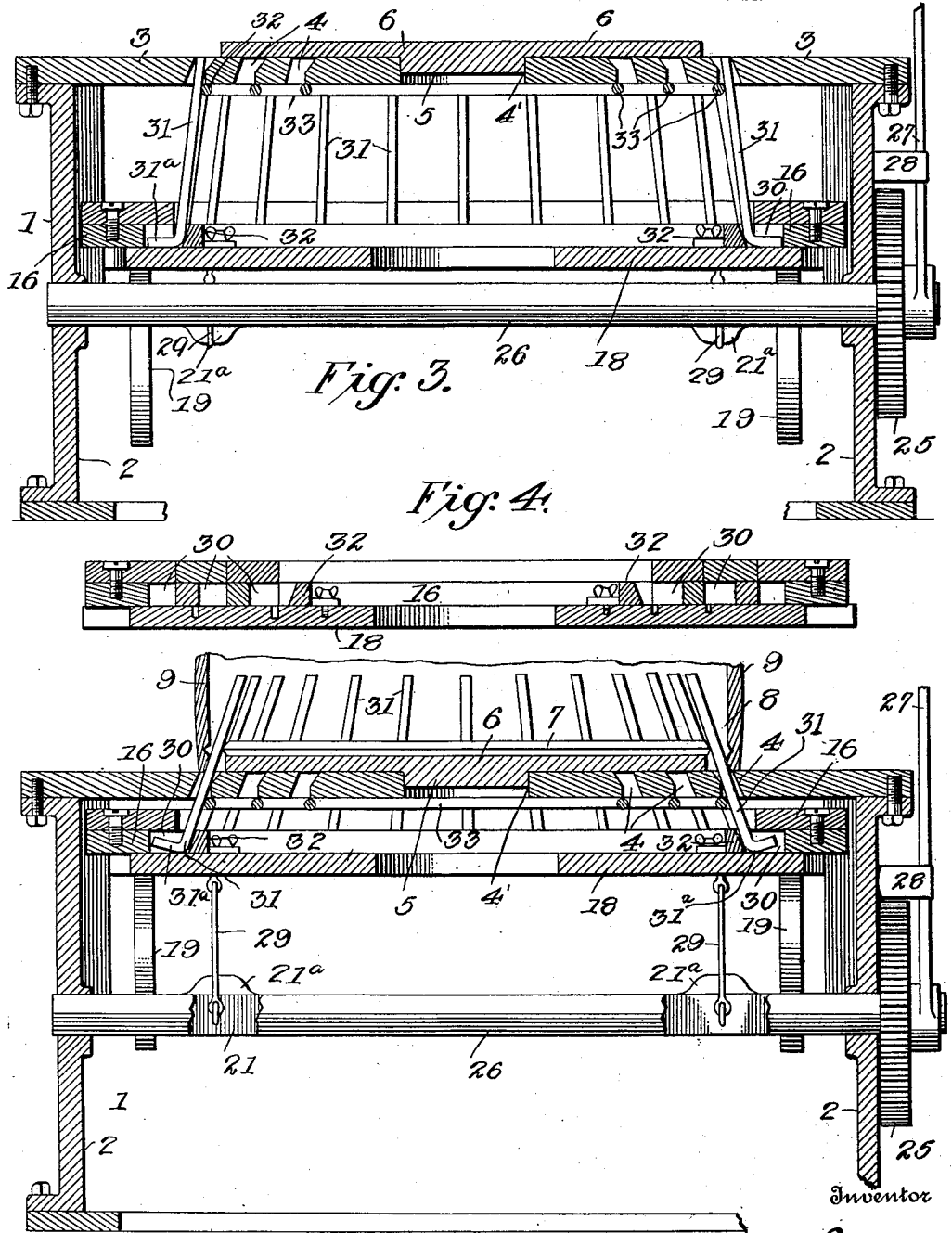

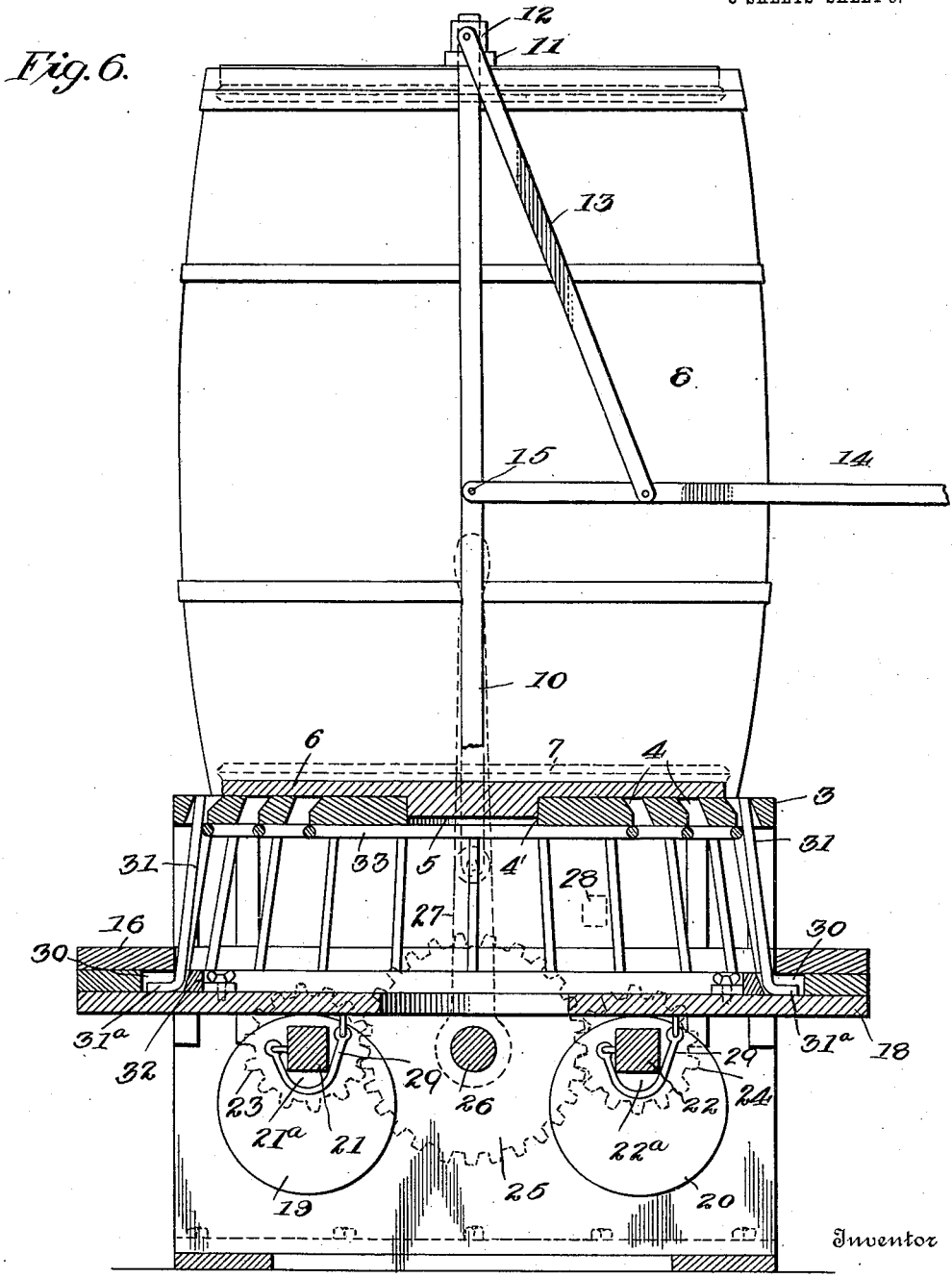

UNITED STATES PATENT OFFICE.

JOHN R. PLACE, OF VOSBURG, PENNSYLVANIA, ASSIGNOR OF ONE-HALF TO CHARLES H. ACE, OF VOSBURG, PENNSYLVANIA.

MACHINE FOR HEADING BARRELS, KEGS, AND THE LIKE.

1,070,841. Specification of Letters Patent. Patented Aug. 19, 1913.

Application filed May 27, 1911. Serial No. 629,816.

*To all whom it may concern:*

Be it known that I, JOHN R. PLACE, a citizen of the United States, residing at Vosburg, in the county of Wyoming and State of Pennsylvania, have invented certain new and useful Improvements in Machines for Heading Barrels, Kegs, and the Like, of which the following is a specification, reference being had therein to the accompanying drawing.

This invention relates to machines for heading barrels, kegs, and the like.

The object of the invention is to provide a machine for inserting the heads in barrels (such as those designed to hold flour, sugar, cement, etc.) kegs, and the like, and wherein the heads generally comprise a plurality of loose pieces that are not, for the most part, secured together.

A further object of my invention is to provide a machine of this class which is adapted to be operated with great speed, whereby its capacity is far greater than machines of this class with which I am now familiar.

A still further object of the invention is to provide a machine of this class which is designed to be driven either manually or by a suitable power device, always under the control of the operator, and which is capable of rapid operation.

Still another object of the invention is to provide a machine of the class specified wherein the parts constituting the head-inserting mechanism are comparatively few in number, so that the danger or likelihood of the machine becoming disorganized, while being operated, is reduced to a minimum.

With these and other important objects in view, the invention resides, generally, in a platform which is adapted to support the staves of which the barrel, keg, etc., is constructed, a suitable support for the pieces of the head to be inserted, and means for spreading the ends of the staves in order that, when released, they may firmly embrace the periphery of the head, as required.

More specifically stated, the invention resides in a platform or table, a head-supporting member disposed thereon, stave-spreading mechanism adapted to be actuated in relation to the ends of the stave into which the head is to be inserted, and means under the control of the operator for actuating said stave-spreading mechanism.

Still more specifically defined, the invention resides in a platform or table, a head-supporting member disposed thereon, stave-spreading mechanism comprising a plurality of elements adapted to be moved into any of a plurality of positions, and, while being so moved, to be changed from a position which they occupy in one plane to a position in a different plane.

The invention also comprises the novel combination and aggroupment of parts and mechanisms, all as hereinafter described and claimed.

In the accompanying drawings, I have illustrated one embodiment of my invention by way of exemplification thereof. It is to be understood, however, that I do not limit myself to the precise structure disclosed, nor to the particular or peculiar relative arrangement and coöperation of the parts thereof, since obviously these are susceptible of considerable modification without amounting to a departure from the spirit of the invention.

Figure 2:
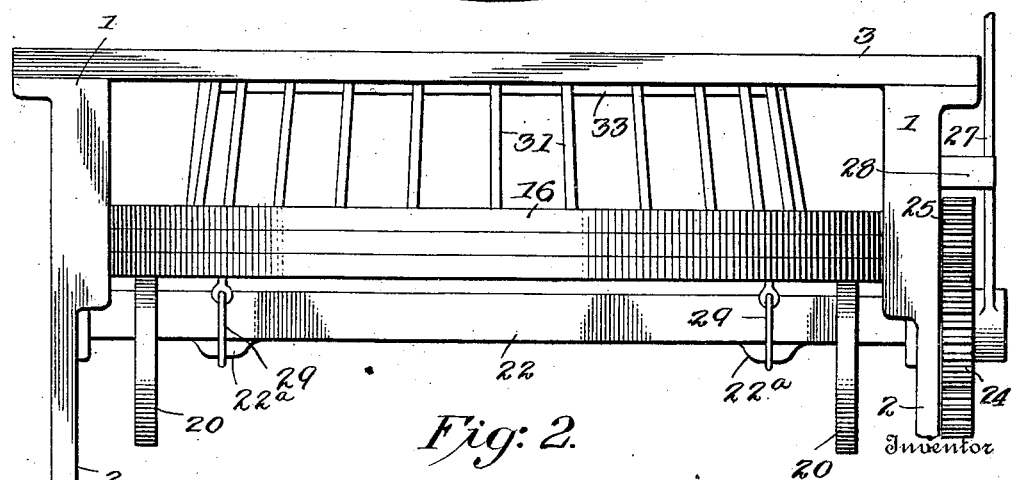

In these drawings: Figure 1 is a view in plan of my preferred embodiment of a barrel-heading machine; Fig. 2 is a front elevation of the same; Fig. 3 is a sectional elevation, taken on the line 3—3, Fig. 1; Fig. 4 is a view in vertical section of a portion of the base-member constituting the stave-spreading mechanism; Fig. 5 is a view similar to Fig. 3, differing therefrom in the position of the stave-spreading elements, these appearing, in Fig. 3, in their normal inoperative position, while, in Fig. 5, they appear in their actuated position; and Fig. 6 is a view in sectional elevation showing the parts of the stave-spreading mechanism after they have been returned to normal position; and a head, in this instance, having previously been inserted and embraced by the staves of the barrel.

Referring to these drawings, the numeral 1 designates, generally, a table or platform, which may be of any suitable form and which is preferably supported on legs or standards 2. The table or platform preferably includes a top-plate 3 provided with one or more series of apertures or holes 4, for a purpose presently to be explained. The platform is also provided with a central opening 4 adapted to receive a depending circular portion 5 of a head-supporting member 6. The parts, as thus constituted, are designed to support the plurality of pieces which constitute the head 7 that is to be inserted into the barrel 8, the latter comprising a plurality of staves or members 9.

I have, in the foregoing, described the respective means whereby the barrel and barrel-head are supported preparatory to the insertion or positioning of said head in the barrel.

Any suitable means for holding the barrel upon its supporting platform may be utilized: In Fig. 6, I have illustrated a suitable device for effecting this purpose, the same comprising two upstanding members 10 adapted to be attached, in any preferred manner, to the sides of the table 1 and having, at their upper ends, a crosspiece 11, which is designed to engage the upper end of the barrel. The position of this cross-piece 11 is controlled by an engaging member 12, the position of which is determined by the movement of the actuating arms 13 (one at each side of the barrel) pivoted to the ends of the engaging piece 12 and, at their lower ends, to the operating lever 14 which comprises a frame, as shown, pivoted at 15 to the upstanding members 10 intermediate of their ends.

It will be understood that when the lever-frame 14 is raised, the engaging member 12 is positioned so that the cross-piece 11 is disengaged from the top of the barrel to permit the latter to be removed. When a barrel is to be secured to the platform, it is positioned thereon, as shown in Fig. 6, the lever-frame 14 is moved into the position shown in said figure, and, through the arms 13, the engaging member 12 forces the cross-piece 11 hard against the upper end of the barrel, as well understood in the art.

Assuming that the barrel has been secured in position, as in the manner just described, the mechanism for spreading the lower ends of the staves 9 is operated. This stave-spreading mechanism comprises the following structure: Underlying the top-plate 3 of the table is a ring-member 16, of any suitable construction; but, preferably, comprising a plurality of segments 17, 17. This ring-member is preferably mounted upon a cam-engaging plate 18, of such dimensional area as to overlie and be engaged by a plurality of sets of cam-members 19 and 20, each set thereof being respectively secured to shafts 21 and 22, arranged longitudinally of the table and suitably journaled in the ends of the table. The respective shafts are driven by pinions 23 and 24 mounted at the ends thereof, and which are adapted to be driven, in opposite directions, by a drive-gear 25 mounted on the end of a central shaft 26 and upon the end of which is mounted a lever 27. It will be understood that the lever is adapted to be moved back and forth by the operator, and, in order to limit its movement, stops 28 are mounted on the side of the table and in the path of the lever. Normally, the cams will be so disposed that the portions of their peripheries farthest removed from their axis will be in the lower position, shown particularly in Fig. 6. When, however, the lever 27 is operated, the drive-gear 25 will turn the pinions and thereby cause said cam-members to be given a rotative movement which, by reason of their being in contact with the cam-engaging plate 18 causes the latter to be elevated. It will be seen, therefore, that the position of the cam-engaging plate is controlled by the cam-members and that the latter are controlled by the lever 27 which, as is manifest, is always under the control of the operator. Obviously, the drive-gear 25 may be actuated by means other than said lever; but, for all practical purposes, it has been found convenient to utilize the lever form of operating mechanism.

While gravity could be utilized to return the cam-engaging plate 18 to its lowermost position, yet, to insure its return positively, I prefer to connect with it a series of links 29 or other form of connecting means, the same having one of their ends attached to the cam-engaging plate 18 and their other ends secured to the cam-carrying shafts $21^a$ and $22^a$. These shafts are, as shown, preferably square and, on their lower faces, are adapted to carry link-engaging blocks 21 and 22 which aid, when the links or chains 29 embrace the same, in drawing the cam-engaging plate 18 downward.

Loosely mounted in channels 30 in the ring-member 16, as shown, are upstanding stave-engaging members 31. There are a plurality of these members 31 and each is adapted to occupy a position in one of the apertures 4. As clearly shown in Figs. 3 and 4, these apertures or holes 4 are cut at an angle to the plane of the surfaces of the top-plate 3, for a purpose presently to be explained. As shown in Fig. 3, the members 31 are adapted normally to be inserted in the apertures 4, and their upper ends will not project beyond the upper surface of said top-plate 3. When, however, the cam-engaging plate 18 is actuated, in the manner described, it will elevate the ring-member 16 to cause the several stave-engaging members 31 to be thrust upwardly and into the position illustrated in Fig. 5. The members 31 are angulated at their lower ends to provide a foot-portion $31^a$ that normally rests upon the upper surface of the cam-engaging member 18 and which is designed to be loose in the channels 30 formed in the ring-member 16.

The channel 30 is formed by disposing a removable and segmental ring 32 suitably secured to the cam-engaging member 18 opposite to the inner peripheral wall of the ring-member 16.

Underlying the top-plate 3 and in juxtaposition to the apertures 4 therein is a resilient ring 33 which, by bearing against the members 31, is adapted to hold the same in operative position, in the manner disclosed in Figs. 3 and 5.

By reason of the inclined formation of the apertures 4 and the relative position of the ring 33, just described, it will be seen that when the cam-engaging member 18 and the ring-member 16 are elevated, the members 31 will be given a movement which is progressively changed so that they will be moved out of the plane which they are shown as occupying in Fig. 3 into the plane shown in Fig. 5. The purpose of this is to position their upper ends some distance from the inner walls of the staves 9 so that, when the cam-engaging member 18 is lowered, in the manner already explained, the members 31, fulcruming, so to speak, on the ring 33, will be forced outwardly and thereby press the staves 9 outwardly and away from the periphery of the barrel-head 7 so that, when the said upper ends of the members 31 have been returned to normal position and just below the plane of the lower ends of the staves, the latter, by reason of their resiliency or elasticity, will be released and close upon the barrel-head. It will be seen, therefore, that, when the members 31 are being returned to normal position they simultaneously move in two directions, namely, longitudinally and outwardly, and by these two movements effect their designed function, namely, of spreading the staves, so that when the ends of the members 31 disengage therefrom, they will close upon the barrel-head.

I am aware that it has heretofore been proposed to include, in barrel-heading machines, stave-spreading mechanism which comprises a plurality of movable elements adapted to engage and press outwardly the several staves of the barrel; but it is a novelty, so far as I am aware, to provide stave-spreading mechanism which includes members that are adapted to have a plurality of movements while being positioned. The efficacy of this particular form of construction is that a maximum of power is produced by the exertion of a minimum of force on the part of the operator. This is an important desideratum in machines of this character. In other machines, with which I am familiar, a maximum of force is required to secure the necessary power to effect a spreading of the staves.

Another feature of novelty of my invention is the interchangeability of certain of the parts, whereby the machine is adapted to head barrels, and the like, of different sizes: To this end, the top-plate 3 is provided, as already stated, with a plurality of series of apertures. In this instance, I have shown three series, namely, an outer series, an inner series, and an intermediate series. In the several views, the stave-spreading members 9 are shown as disposed in the outer series. Should it be desired to utilize one or another of the other series, it is unnecessary to provide another top-plate, because the members 31 can be inserted in the particular series of apertures required. As shown, each of these series has its own particular member-fulcruming ring 33. The changes which are required to adjust the machine for a smaller barrel or keg are to provide a smaller head-supporting member 6. Again, the ring 32 is removed and a smaller ring mounted on the cam-engaging member 18. Similarly, a smaller ring-member is substituted for that designated 16. It is obvious of course that the ring 32 and ring-member 16, of smaller dimensions, might be permanently mounted in the machine, and be so arranged that the members 31 could be attached therein with great convenience and facility.

By the foregoing description, it will be clear that I provide a machine of great power, capacity and efficiency, and one which is adapted to perform its required functions with precision and great speed.

While I have herein described my invention in detail, and specified certain relative positions, operations and coöperations of the parts, it is nevertheless to be understood that I may vary or modify these, and therefore I am not to be limited to these precise forms, aggroupments, etc., except in so far as they may be specified in the claims.

Having thus described my invention, what I claim is:

1. A machine for heading barrels, kegs, and the like, including in combination, a supporting structure, a head-supporting member, stave-spreading mechanism including a plurality of movable members, means for thrusting said members, and means coöperating therewith to tilt said members whereby they are caused to assume a relatively angular position.

2. A machine for heading barrels, kegs, and the like, including in combination, a barrel-supporting table, a head-supporting member removably supported therein, a plurality of stave-spreading members, a ring-member in which said stave-spreading members are supported, and adapted to change the angle of position of said members during their longitudinal movement, a cam-engaging member connecting with said member-carrying ring, a series of cams operatively engaging said cam-engaging member, shafts upon which said cams are mounted, and means for actuating said shafts in unison.

3. A machine for heading barrels, kegs, and the like, including in combination, a table, a top-plate mounted thereon and provided with a series of circularly-arranged apertures, a ring-member underlying said top-plate and movable relatively thereto, stave-spreading members carried by and movable with said ring-member and normally occupying a position in said apertures in the top-plate, a cam-engaging member connecting with said ring-member, a series of cams engaging said cam-engaging member, and means for actuating said cams to actuate said stave-spreading members.

4. A machine for heading barrels, kegs, and the like, including in combination, a table, a top-plate mounted thereon and provided with a series of circularly-arranged apertures formed at an angle to the surface of said top-plate, a guide-ring arranged in juxtaposition to said top-plate and in guiding relation to said apertures, a series of stave-spreading members movable in said inclined apertures and having an operative engagement with said guide-ring, and means for actuating said ring-member whereby said stave-spreading members are simultaneously moved in a plurality of directions.

5. A barrel-heading machine including in combination, a platform adapted to support barrel-staves, a supporting plate for the barrel-head, means for spreading the ends of the staves comprising a member provided with a series of annularly-arranged apertures, stave-engaging members movable in said apertured member and adapted, when actuated, to be shifted out of normal position to a position at an angle thereto, and means for effecting movement of said members including a fulcrum-ring.

6. A barrel-heading machine including in combination, a platform adapted to support barrel-staves, a supporting plate for the barrel-head, means for spreading the ends of the staves comprising a member provided with a series of annularly-arranged apertures, stave-engaging members movable in said apertured member and adapted, when actuated, to be shifted out of normal position to a position at an angle thereto, and means for effecting movement of said members including a fulcrum-ring formed of a plurality of segmental elements.

7. A barrel-heading machine including in combination, a platform adapted to support barrel-staves, a supporting plate for the barrel-head, means for spreading the ends of the staves comprising a member provided with a series of annularly-arranged apertures, a cam-engaging member upon which ring-segmental-elements are mounted, stave-engaging members movable in said apertured member and adapted, when actuated, to be shifted out of normal position to a position at an angle thereto, and means for effecting movement of said members including a fulcrum-ring formed of a plurality of segmental elements, aforementioned.

8. A barrel-heading machine including in combination, a stave-supporting structure and a head-supporting instrumentality adapted to maintain the head in position to be embraced by the ends of the staves, a plurality of stave-spreaders movable longitudinally and adapted to assume a position at an angle to their normal position, and means for projecting said spreaders longitudinally, first in one direction and then into a position at a distinct angle to the normal.

9. A barrel-heading machine including in combination, a stave-supporting structure and a head-supporting instrumentality adapted to maintain the head in position to be embraced by the ends of the staves, a plurality of stave-spreaders movable longitudinally and adapted to assume a position at an angle to their normal position, and means operating first to project said stave-spreaders longitudinally and, then, to effect a tilting movement thereof, and a spreader-guiding ring on which said spreaders are movable.

10. A barrel-heading machine including in combination, a stave-supporting structure and a head-supporting instrumentality adapted to maintain the head in position to be embraced by the ends of the staves, a plurality of stave-spreaders movable longitudinally and adapted to assume a position at an angle to their normal position, a spreader-guiding ring on which said spreaders are movable, and means for actuating said spreaders, including instrumentalities for changing the angle of movement of said spreaders.

11. A barrel-heading machine including in combination, a stave-supporting structure and a head-supporting instrumentality adapted to maintain the head in position to be embraced by the ends of the staves, a plurality of stave-spreaders movable longitudinally and adapted to assume a position at an angle to their normal position, means for moving said spreaders longitudinally, means engaging the same to change the angle of movement of the same, a spreader-guiding ring on which said spreaders are movable, and a barrel-holding structure comprising a plurality of upstanding members and a cross-piece and means for moving said cross-piece.

12. A barrel-heading machine including in combination, a stave-supporting structure and a head-supporting instrumentality adapted to maintain the head in position to be embraced by the ends of the staves, a plurality of stave-spreaders movable longitudinally and adapted to assume a position at an angle to their normal position, a spreader-guiding ring on which said spreaders are movable, and means for actuating said spreaders, including a top-plate provided with a plurality of angularly-cut apertures.

13. A barrel-heading machine including in combination, a stave-supporting structure, a plurality of stave-spreaders, a stave-controlling instrumentality, means for projecting said spreaders longitudinally out of, and for withdrawing the same into, said stave-controlling instrumentality, and means for tilting said spreaders intermediate of their being projected out of and returned into said instrumentality.

14. A machine for heading barrels, kegs, and the like, including in combination, a supporting-structure, stave-spreading mechanism including a plurality of movable members, means for reciprocating said members, and means for tilting the members during the reciprocatory movement.

In testimony whereof I affix my signature in presence of two witnesses.

JOHN R. PLACE.

Witnesses:
C. M. FILKINS,
A. J. CORTRIGHT.

---

Copies of this patent may be obtained for five cents each, by addressing the "Commissioner of Patents, Washington, D. C."